(12) United States Patent
Ito

(10) Patent No.: US 6,882,369 B1
(45) Date of Patent: Apr. 19, 2005

(54) ELECTRONIC STILL CAMERA WITH CAPABILITY TO PERFORM OPTIMAL FOCUS DETECTION ACCORDING TO SELECTED MODE

(75) Inventor: Junichi Ito, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/570,597

(22) Filed: May 12, 2000

(30) Foreign Application Priority Data

May 19, 1999 (JP) ............................. 11-138906

(51) Int. Cl.[7] ........................ H04N 5/232; H04N 5/222; G03B 29/00; G03B 13/22
(52) U.S. Cl. .................. 348/345; 348/349; 348/333.01; 396/93; 396/429
(58) Field of Search ..................... 348/333.01, 333.09, 348/333.03, 345, 349, 350, 353, 354, 356, 341, 346, 64; 396/429, 324, 93

(56) References Cited

U.S. PATENT DOCUMENTS

| | | | | |
|---|---|---|---|---|
| 5,597,999 A | * | 1/1997 | Kinba et al. | 250/201.7 |
| 6,037,972 A | * | 3/2000 | Horiuchi et al. | 348/64 |
| 6,091,450 A | * | 7/2000 | Hirasawa | 348/333.01 |
| 6,453,124 B2 | * | 9/2002 | Morimoto et al. | 396/91 |
| 6,639,629 B1 | * | 10/2003 | Takayama et al. | 348/364 |
| 2001/0045989 A1 | * | 11/2001 | Onuki | 348/345 |

FOREIGN PATENT DOCUMENTS

| | | |
|---|---|---|
| JP | 9-43507 | 2/1997 |
| JP | 9-181954 | 7/1997 |
| JP | 10-319310 | 12/1998 |

* cited by examiner

*Primary Examiner*—Andrew Christensen
*Assistant Examiner*—Lin Ye
(74) *Attorney, Agent, or Firm*—Frishauf, Holtz, Goodman & Chick, P.C.

(57) ABSTRACT

An electronic still camera includes a finder optical system for viewing a subject image. An imaging section obtains the subject image. A display section displays the subject image based on image data associated with the subject image obtained by the imaging section. A mode selecting section selects either a first mode in which the electronic still camera performs imaging operation using the imaging section while a user views the subject image through the finder optical system or a second mode in which the electronic still camera performs imaging operation using the imaging section while the user views the subject image on the display section. A first focus detection circuit performs a first focus detecting operation when the first mode is selected by the mode selecting section. A second focus detection circuit performs a second focus detecting operation when the second mode is selected by the mode selecting section.

25 Claims, 13 Drawing Sheets

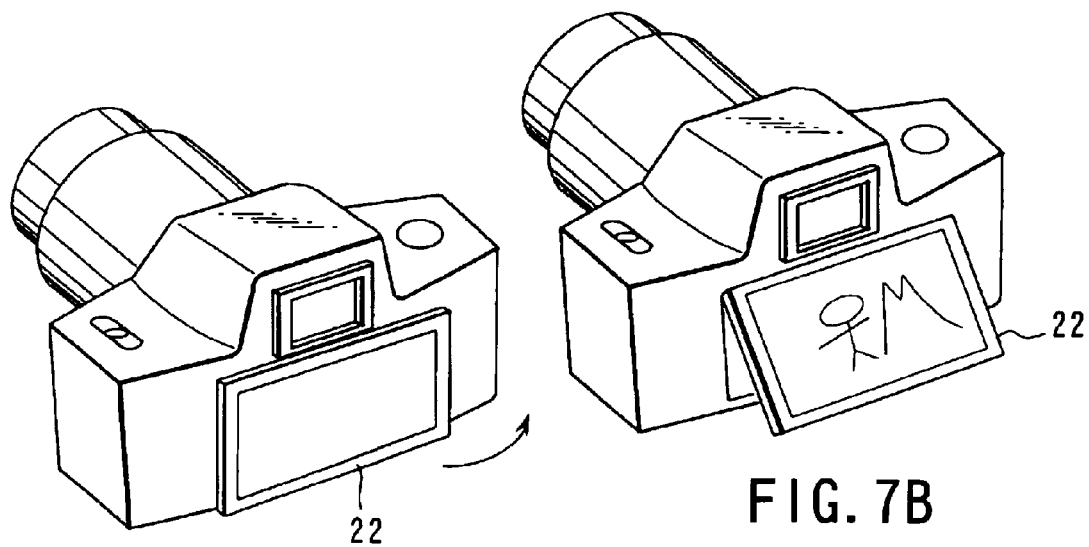
FIG. 7A
FIG. 7B
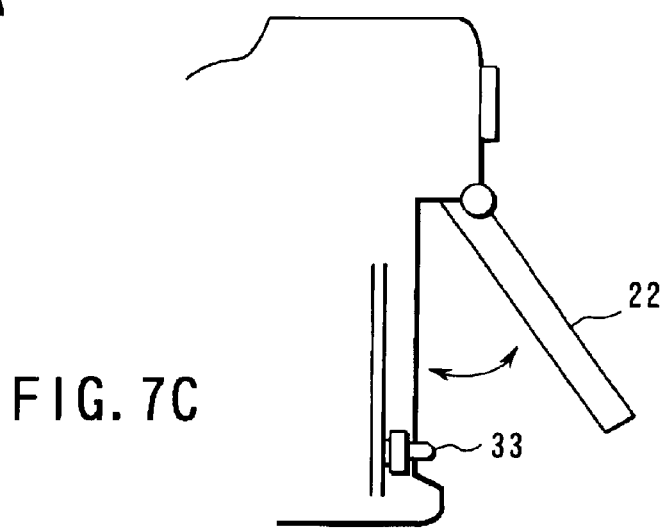
FIG. 7C
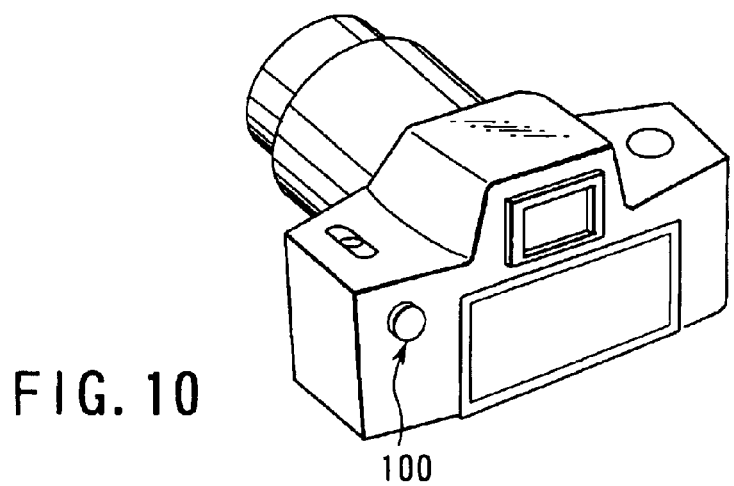
FIG. 10

ELECTRONIC STILL CAMERA WITH CAPABILITY TO PERFORM OPTIMAL FOCUS DETECTION ACCORDING TO SELECTED MODE

CROSS-REFERENCE TO RELATED APPLICATIONS

This application is based upon and claims the benefit of priority from the prior Japanese Patent Application No. 11-138906, filed May 19, 1999, the entire contents of which are incorporated herein by reference.

BACKGROUND OF THE INVENTION

The present invention relates to an electronic still camera.

Electronic still cameras often employ contrast auto focus (AF) using an imaging device. While contrast AF does not require a special optical system or sensor, it suffers a slow operation because it seeks a focus point while driving the lens.

Jpn. Pat. Appln. KOKAI Publication No. 9-181954 and Jpn. Pat. Appln. KOKAI Publication No. 10-319310 disclose the technique that acquires image data by alternately moving apertures for splitting the pupil (a pair of pupil apertures) disposed in the optical path and computes the amount of defocus from image data obtained through the two actions in order to execute phase difference AF using the CCD of an imaging device. As this scheme can accomplish phase difference AF using an imaging device, the AF operation becomes faster.

Another type of electronic still camera that has a similar structure to that of a single-lens reflex camera which uses a silver film has also been put to a practical use.

General electronic still cameras have an LCD (Liquid Crystal Display) monitor and can display a picked-up image on this monitor in real time. A user may decide a composition using this monitor before taking a picture. When an AF operation is carried out using the scheme disclosed in the aforementioned prior arts, the presence of the apertures in the optical path prevent any display being made on the monitor during the AF operation.

A single-lens reflex type electronic still camera executes a focus detecting operation by guiding rays of light to a phase difference AF sensor via a quick return mirror, sub mirror and so forth placed on the optical axis of the imaging lens. Because the quick return mirror and sub mirror are located between the imaging device and the imaging lens, however, an image obtained by other operations than an imaging operation cannot be displayed on the LCD monitor.

Accordingly, it is an object of the present invention to provide an electronic still camera that has no image display break on the monitor screen while maintaining a fast AF operation which is ensured by the use of phase difference AF.

BRIEF SUMMARY OF THE INVENTION

To achieve the above object, according to the first aspect of this invention, there is provided an electronic still camera comprising:

a finder optical system for viewing a subject image;

an imaging section for obtaining the subject image;

a display section for displaying the subject image based on image data associated with the subject image obtained by the imaging section;

a mode selecting section for selecting either a first mode in which the electronic still camera performs imaging operation using the imaging section while a user views the subject image through the finder optical system or a second mode in which the electronic still camera performs imaging operation using the imaging section while the user views the subject image on the display section;

a first focus detection circuit for carrying out a first focus detecting operation when the first mode is selected by the mode selecting section; and a second focus detection circuit for carrying out a second focus detecting operation when the second mode is selected by the mode selecting section.

According to the second aspect of this invention, there is provided an electronic still camera equipped with a finder optical system and an imaging optical system independent of each other, which comprises:

a pupil splitting aperture, provided in an optical path of the imaging optical system, for splitting a subject image into a plurality of images;

an imaging section for obtaining the subject image;

a display section for displaying the subject image based on image data associated with the subject image obtained by the imaging section;

a mode selecting section for selecting either a first mode in which the electronic still camera performs imaging operation using the imaging section while a user views the subject image through the finder optical system or a second mode in which the electronic still camera performs imaging operation using the imaging section while the user views the subject image on the display section;

a first focus detection circuit for carrying out a first focus detecting operation by using the pupil splitting aperture when the first mode is selected by the mode selecting section; and a second focus detection circuit for carrying out a second focus detecting operation without using the pupil splitting aperture when the second mode is selected by the mode selecting section.

According to the third aspect of this invention, there is provided an electronic still camera of a single-lens reflex type that causes a subject image having passed an imaging optical system to be reflected by a reflection member and guided to a finder optical system, which camera comprises:

a drive circuit for moving the reflection member to a first state positioned in an optical path of the imaging optical system and a second state positioned outside the optical path of the imaging optical system;

an imaging section for obtaining the subject image;

a display section for displaying the subject image based on image data associated with the subject image obtained by the imaging section;

a mode selecting section for selecting either a first mode in which the electronic still camera performs imaging operation using the imaging section while a user views the subject image through the finder optical system or a second mode in which the electronic still camera performs imaging operation using the imaging section while the user views the subject image on the display section;

a first focus detection circuit for carrying out a first focus detecting operation when the first mode is selected by the mode selecting section; and a second focus detection circuit for carrying out a second focus detecting operation when the second mode is selected by the mode selecting section.

According to the fourth aspect of this invention, there is provided a focus detection method for an electronic still camera of a single-lens reflex type, which comprises:

a first focus detection step of carrying out auto focus based on a computation of a phase difference upon selection of a first mode in which the electronic still camera performs imaging operation using an imaging section while a user views a subject image through a finder optical system; and a second focus detection step of carrying out contrast-computation based auto focus upon selection of a second mode in which the electronic still camera performs imaging operation using the imaging section while the user views the subject image on a liquid crystal display section.

According to the fifth aspect of this invention, there is provided a monitor display method for an electronic still camera of a single-lens reflex type, which comprises:

a mode selecting step of selecting either a first mode in which the electronic still camera performs an auto focus operation based on a computation of a phase difference and performs imaging operation using an imaging section while a user views a subject image through a finder optical system or a second mode in which the electronic still camera performs an auto focus operation based on a contrast computation and performs imaging operation using the imaging section while the user views the subject image on a display section;

a non-display step of making no monitor display when the first mode is selected by the mode selecting step; and a display step of making a monitor display based on image data associated with the subject image obtained by the imaging section, when the second mode is selected by the mode selecting step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A shows a focus area 13a of a finder 13 and FIG. 4B is a diagram showing an area 12a on the imaging device 12 corresponding to the focus area 13a;

FIG. 7A shows an LCD monitor 22 at the normal position, FIG. 7B shows the LCD monitor 22 tilted, and FIG. 7C is a diagram for explaining the ON and OFF operations of an LCD-monitor-position detecting switch 33;

FIG. 10 is a external perspective view showing the appearance of a camera equipped with an LCD-monitor switch.

DETAILED DESCRIPTION OF THE INVENTION

Preferred embodiments of the present invention will now be described with reference to the accompanying drawings.

(First Embodiment)

Figure 1:
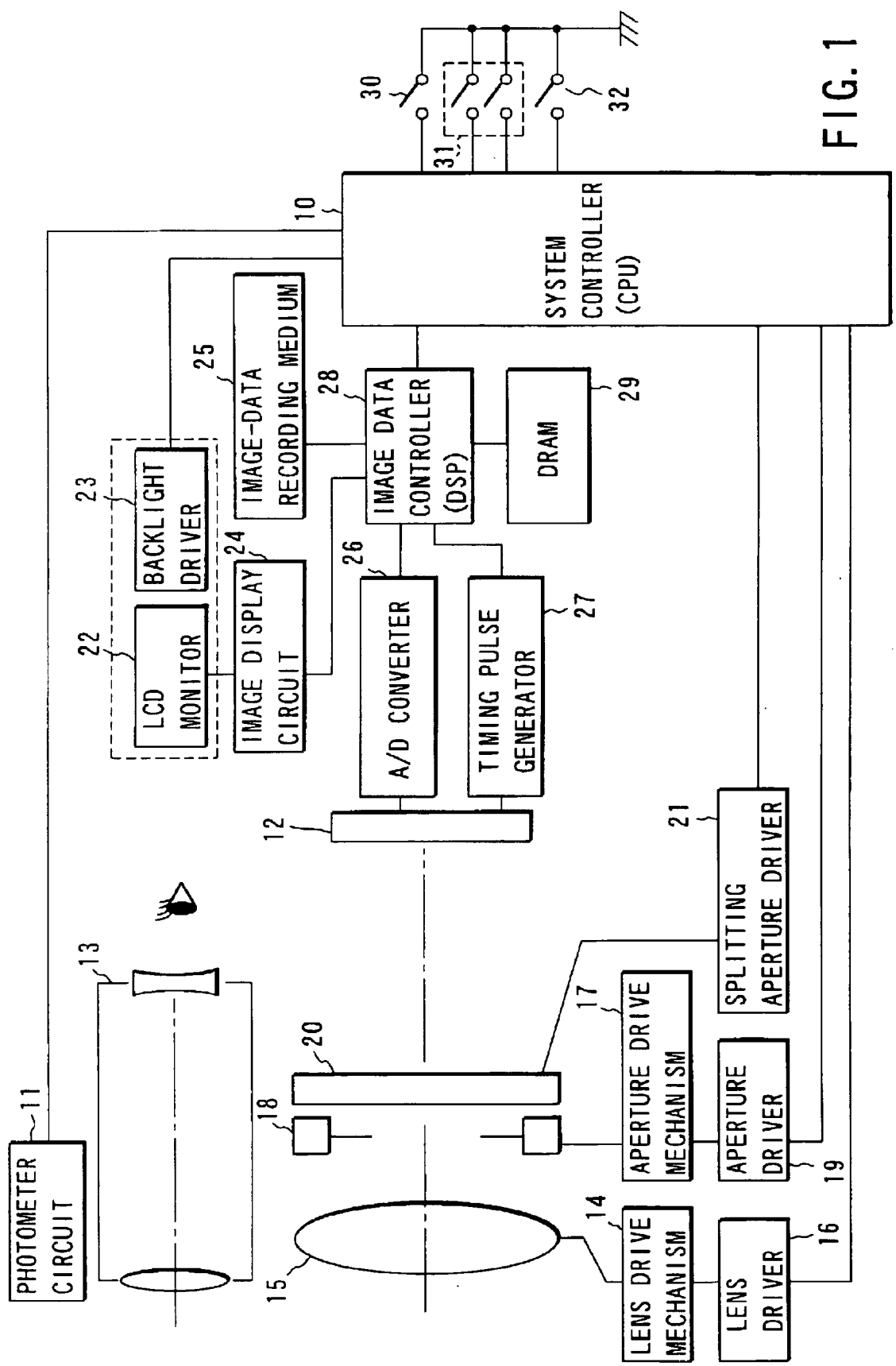
FIG. 1 is a block structural diagram of an electronic still camera according to a first embodiment of this invention.

FIG. 1 is a block structural diagram of an electronic still camera according to a first embodiment of this invention.

A system controller (hereinafter called "CPU") 10 performs the general control of the electronic still camera according to this embodiment. A photometer circuit 11 measures the luminance of a subject. The CPU 10 determines the set value of an aperture and the integration time of an imaging device (imaging section) 12 based on the luminance information from the photometer circuit 11. A finder 13 is used to check an imaging area. A lens drive mechanism 14 has an actuator such as a motor and converts the drive force of this actuator to the motion of an imaging lens 15 on the optical axis. Power is supplied to the actuator from a lens driver 16. The CPU 10 can arbitrarily set the position of the imaging lens 15 by controlling the lens driver 16. An aperture drive mechanism 17 has an actuator such as a step motor and drives blades which constitutes an aperture 18. Power is supplied to this actuator from an aperture driver 19. The CPU 10 can arbitrarily set the position of the aperture 18 by controlling this aperture driver 19.

A pupil splitting aperture 20 is positioned in the vicinity of the aperture 18. Focus detection using the imaging device 12 can be accomplished by controlling this pupil splitting aperture 20. The principle of the focus detection is disclosed in, for example, Jpn. Pat. Appln. KOKAI Publication No. 9-43507. The aforementioned Jpn. Pat. Appln. KOKAI Publication No. 10-319310 discloses the mechanism of a pupil splitting aperture.

According to this embodiment, the pupil splitting aperture 20 is constructed by using, for example, a liquid crystal which can electrically pass and block light. This liquid crystal is driven by a splitting aperture driver 21.

Figure 2A:
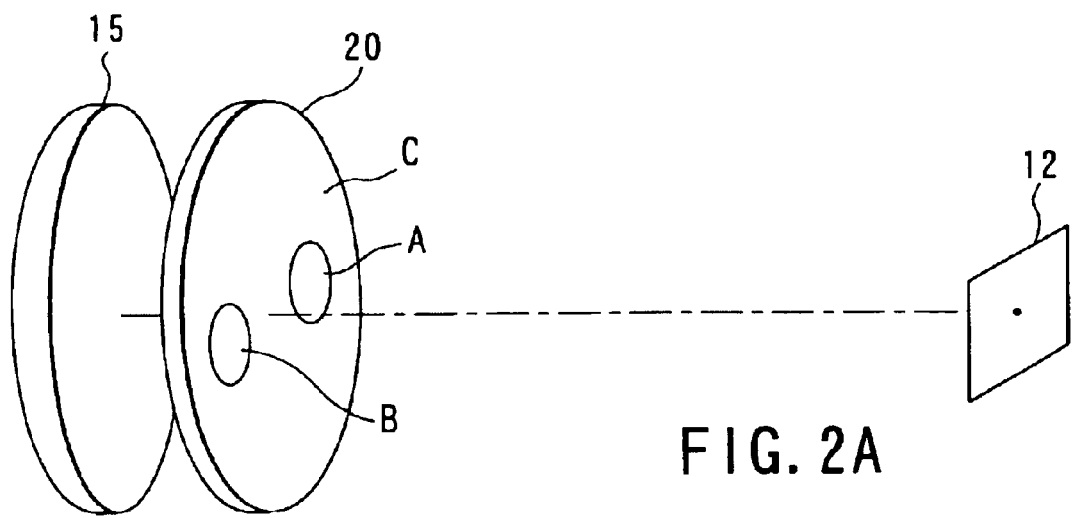
FIG. 2A is a diagram showing the structure of a pupil splitting aperture 20 and a positional relationship among this aperture and an imaging lens 15 and an imaging device 12.

FIG. 2A is a diagram showing the structure of the pupil splitting aperture 20 and a positional relationship among this aperture 20 and the imaging lens 15 and the imaging device 12. As shown in this figure, the pupil splitting aperture 20 comprises three segments (A, B and C).

Figure 2B:
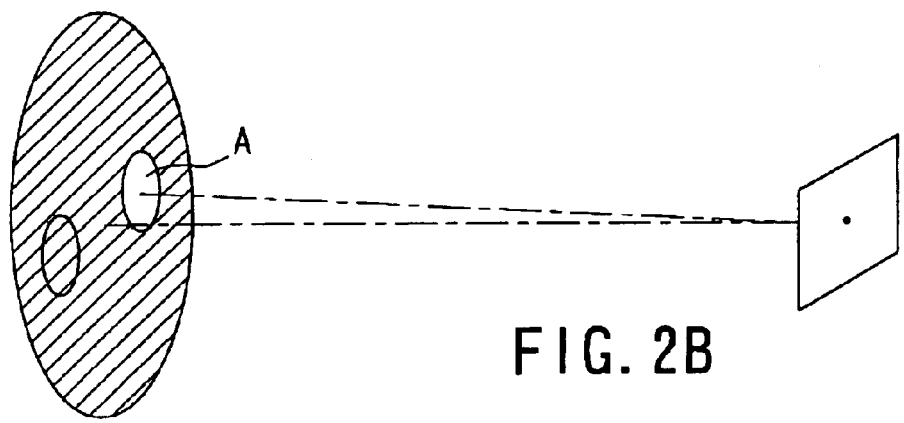
FIGS. 2B and 2C are diagrams for explaining a scheme for focus detection.
Figure 2C:
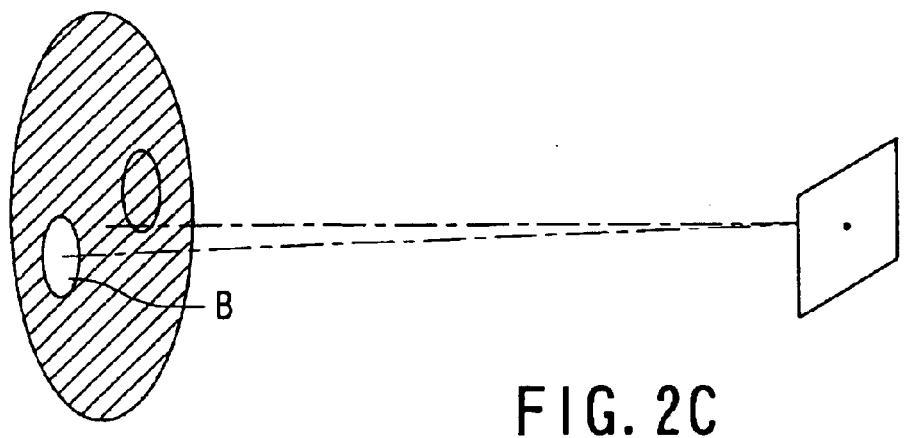

With this structure, focus detection is carried out as follows. First, as shown in FIG. 2B, image data obtained on the imaging device 12 by imaging operation performed with only the segment A set to pass light is fetched and stored in memory. Then, as shown in FIG. 2C, image data obtained on the imaging device 12 by imaging operation performed with the segment B alone set to pass light is fetched and stored in memory. The CPU 10 executes phase difference computation using those two pieces of image data. If the image of a subject through the imaging lens 15 is on focus on the imaging device 12, the two pieces of image data should overlap one on the other, causing no phase difference. If the subject image is out of focus, there should be a deviation between the two pieces of image data. The amount of displacement of the imaging lens 15 is acquired by obtaining the amount of this deviation through phase difference computation.

Returning to FIG. 1, the CPU 10 is connected to an image data controller 28. This image data controller 28 is an image correcting section which is comprised of a DSP (Digital Signal Processor). The image data controller 28 performs operations, such as correction and processing, on the input image data from the imaging device 12 based on an instruction from the CPU 10.

The image data controller 28 is connected to a timing pulse generator 27 which outputs a pulse signal needed at the time of driving the imaging device 12, an A/D converter 26 which receives the timing pulse generated by the timing pulse generator 27 and converts an analog signal corresponding to the subject image output from the imaging device 12 to a digital signal, and a DRAM 29 which temporarily stores the acquired image data (digital data).

An image display circuit 24 controls a liquid crystal display (LCD) monitor 22. The image display circuit 24 and the LCD monitor 22 constitute a display section. The image display circuit 24 displays the input image data from the imaging device 12 on the LCD monitor 22. A backlight driver 23 controls backlight which illuminates the LCD monitor 22. An image-data recording medium 25 is constituted by a flash memory, HDD, FDD or the like.

The CPU 10 is further connected to a power switch 30, a release switch 31 and a mode switch 32. The camera system is permitted to operate only when the power switch 30 is on. The release switch 31 is a two-stage switch having a first release switch and a second release switch. When the release switch 31 is half depressed, the first release switch is set on. When the release switch 31 is further depressed, both the first and second release switches are set on.

The mode switch 32 is an operation member (mode selecting section) for manually switching between an operation mode (first operation mode) for allowing user to perform imaging operation while viewing the subject through the finder 13 and an operation mode (second operation mode) for allowing the user to perform imaging operation while viewing the subject using the LCD monitor 22.

Figure 3A:
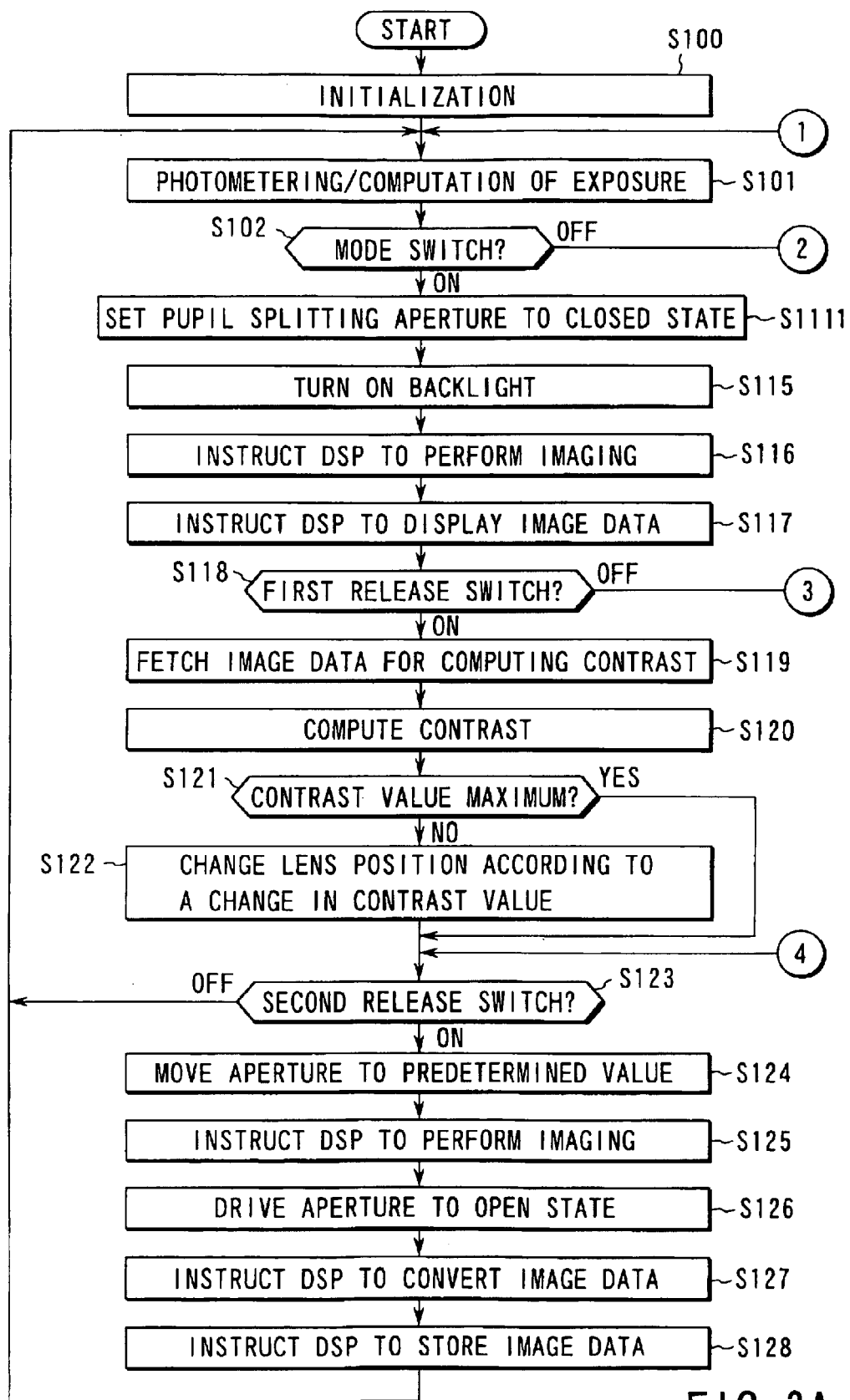
FIGS. 3A and 3B are flowcharts for explaining the operation of a CPU 10 in the first embodiment of this invention.
Figure 3B:
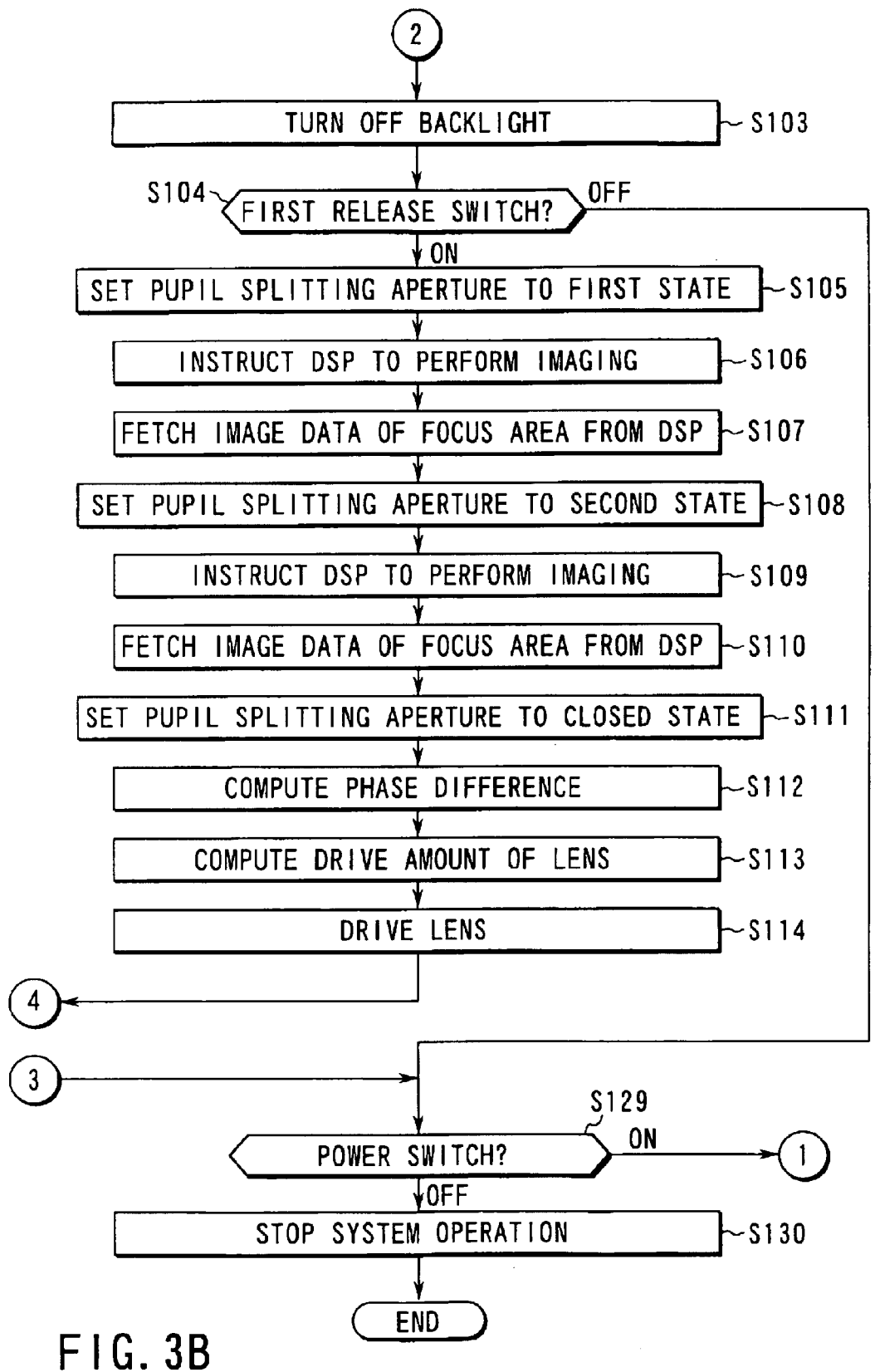

FIGS. 3A and 3B are flowcharts for explaining the operation of the CPU 10 in the first embodiment. When the power switch 30 is set on, power is supplied to the camera system and the CPU 10 starts operating. In step S100 first, various initializations, such as memory initialization, initialization of the I/O ports and initialization of the peripheral circuits of the CPU 10, are carried out. In step S101, the CPU 10 receives the luminance information of the subject from the photometer circuit 11. Based on this information, the CPU 10 computes the set value of the aperture and the integration time of the imaging device 12. In step S102, the status of the mode switch 32 is detected. When the mode switch 32 is on, imaging operation is performed while allowing the user to view the subject using the LCD monitor 22. In this case, the flow proceeds to step S1111 from step S102. In step 1111, the liquid crystal segments A, B and C constituting the pupil splitting aperture 20 are made transparent, and the pupil splitting aperture 20 is brought into the closed state. In step S115, the backlight of the LCD monitor 22 is turned on. In step S116, the CPU 10 instructs the DSP 28 to perform an imaging operation.

When given such an instruction, the DSP 28 fetches image data by controlling the imaging device 12. In step S117, the CPU 10 instructs the DSP 28 to display picked-up image data. The instructed DSP 28 controls the image display circuit 24 to display the image data on the LCD monitor 22. As the processes in steps S116 and S117 are executed cyclically, the status of the subject can be observed in real time on the LCD monitor 22. In step S118, the status of the first release switch is detected. When the first release switch is on, the flow proceeds to step S119 to perform a focus adjusting operation. When the first release switch is off, the flow goes to step S129.

In step S129, the status of the power switch 30 is detected. If the power switch 30 is off in this step, the system operation should be stopped. The CPU 10 stops after an operation to stop the system operation is executed in step S130. If the power switch 30 is on, on the other hand, the flow goes to step S101 to continue the operation.

When the flow proceeds to step S119 from step S118, the CPU 10 receives image data for computing the contrast from the DSP 28. This data is part of the image data that the DSP 28 has acquired from the imaging device 12. The image data for contrast computation is obtained as follows.

Figure 4A:
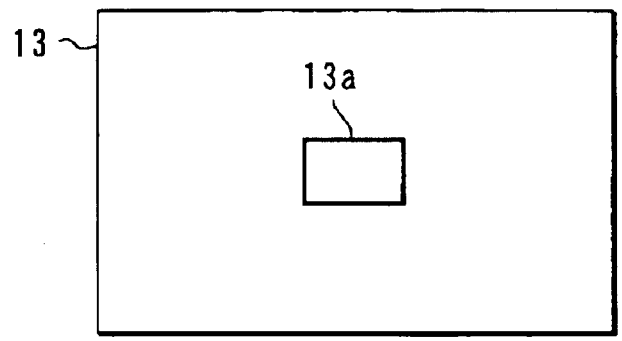
Figure 4B:
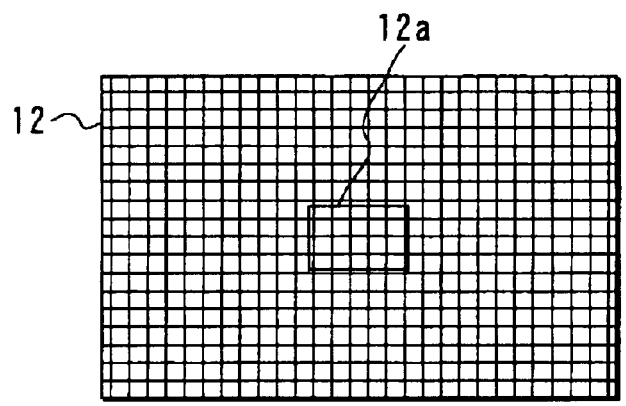

FIG. 4A shows a focus area 13a of the finder 13. In step S119, image data of an area 12a (FIG. 4B) on the imaging device 12 corresponding to the focus area 13a is fetched from the DSP 28. In step S120, known contrast computation is performed on this image data. In general, the difference between adjacent image data is obtained.

Figure 5:
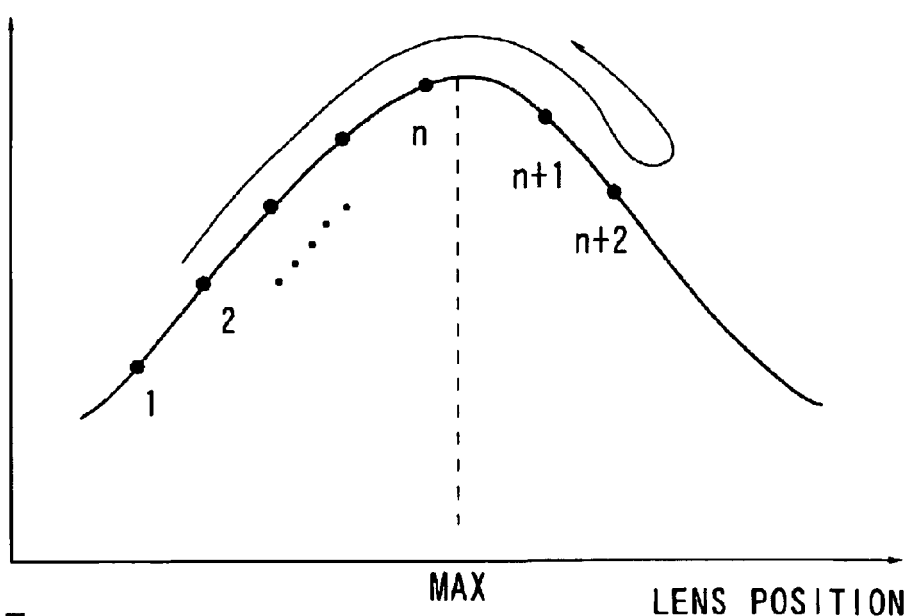
FIG. 5 is a diagram depicting a positional relationship between the lens position and contrast.

In step S121, it is determined is contrast data has a maximum value. To detect that contrast data has the maximum value, contrast computation should be performed while moving the imaging lens 15. FIG. 5 is a diagram depicting a positional relationship between the lens position and contrast. As apparent from this figure, when the contrast tends to increase, the imaging lens 15 is moved in the same direction as the present moving direction in step S122. When the contrast tends to decrease, the moving direction of the imaging lens 15 is reversed in step S122. When it is determined that the contrast is the maximum, it is unnecessary to move the imaging lens 15 so that the flow proceeds to step S123 from step S121. As the operation from step S119 to step S122 is periodically executed, the subject is brought into focus.

In step S123, the status of the second release switch is detected. When this release switch is off, the flow returns to step S101, whereas when the release switch is on, the flow goes to step S124. In step S124, the aperture 18 is driven to the position of the aperture value determined in step S101. In step S125, the DSP 28 is instructed to perform an imaging operation with the integration time determined in step S101.

The DSP 28 fetches image data by controlling the imaging device 12 and stores the image data in the DRAM 29. In step S126, the aperture 18 is driven to the release state. In step S127, the DSP 28 is instructed to convert the fetched image data (e.g., conversion to the JPEG format). In step S128, the DSP 28 is instructed to store the converted image data into the image-data recording medium 25. Then, the flow returns to step S101.

When the mode switch 32 is off in step S102, the flow proceeds to step S103 from step S102. The OFF state of the mode switch 32 indicates the selection of the operation mode that allows the camera to carry out imaging operation while a user views the subject through the finder 13. In step S103, the backlight is turned off to disable the display of the LCD monitor 22. In step S104, the status of the first release switch is detected. When the first release switch is on, the flow proceeds to step S105 to execute a focus detecting operation. When the first release switch is off, on the other hand, the flow proceeds to step S123 to detect the status of the power switch 30.

In step S105, the pupil splitting aperture 20 is set to the first state that is shown in FIG. 2B. In step S106, the DSP 28 is instructed to perform an imaging operation. In step S107, data (12a in FIG. 4B) equivalent to the focus area 13a is acquired from the image data that the DSP 28 has acquired from the imaging device 12. This data is stored in the internal memory of the CPU 10. In step S108, the pupil splitting aperture 20 is set to the second state corresponding to the one shown in FIG. 2C.

In step S109, the DSP 28 is instructed to perform an imaging operation. In step S110, as in step S107, image data corresponding to the focus area 13a is acquired from the DSP 28. In step S111, the pupil splitting aperture 20 is brought into the closed state so that no problem occurs at the time of obtaining an image.

In step S112, known phase difference computation is carried out using the data fetched in step S107 and the data fetched in step S110 to thereby acquire the amount of defocus. In step S113, the amount of driving the lens is acquired from this defocus amount. In step S114, the lens is driven based on the driving amount. Then, the flow proceeds to step S123.

In the above-described first embodiment, one of two operation states is selected by the mode switch. As an alternative way, the operation state may be automatically selected based on the result of focus detection. Further, contrast AF may be performed first, and if the contrast AF is not feasible, auto focus may be switched to the phase-difference type AF.

(Second Embodiment)

Figure 6:
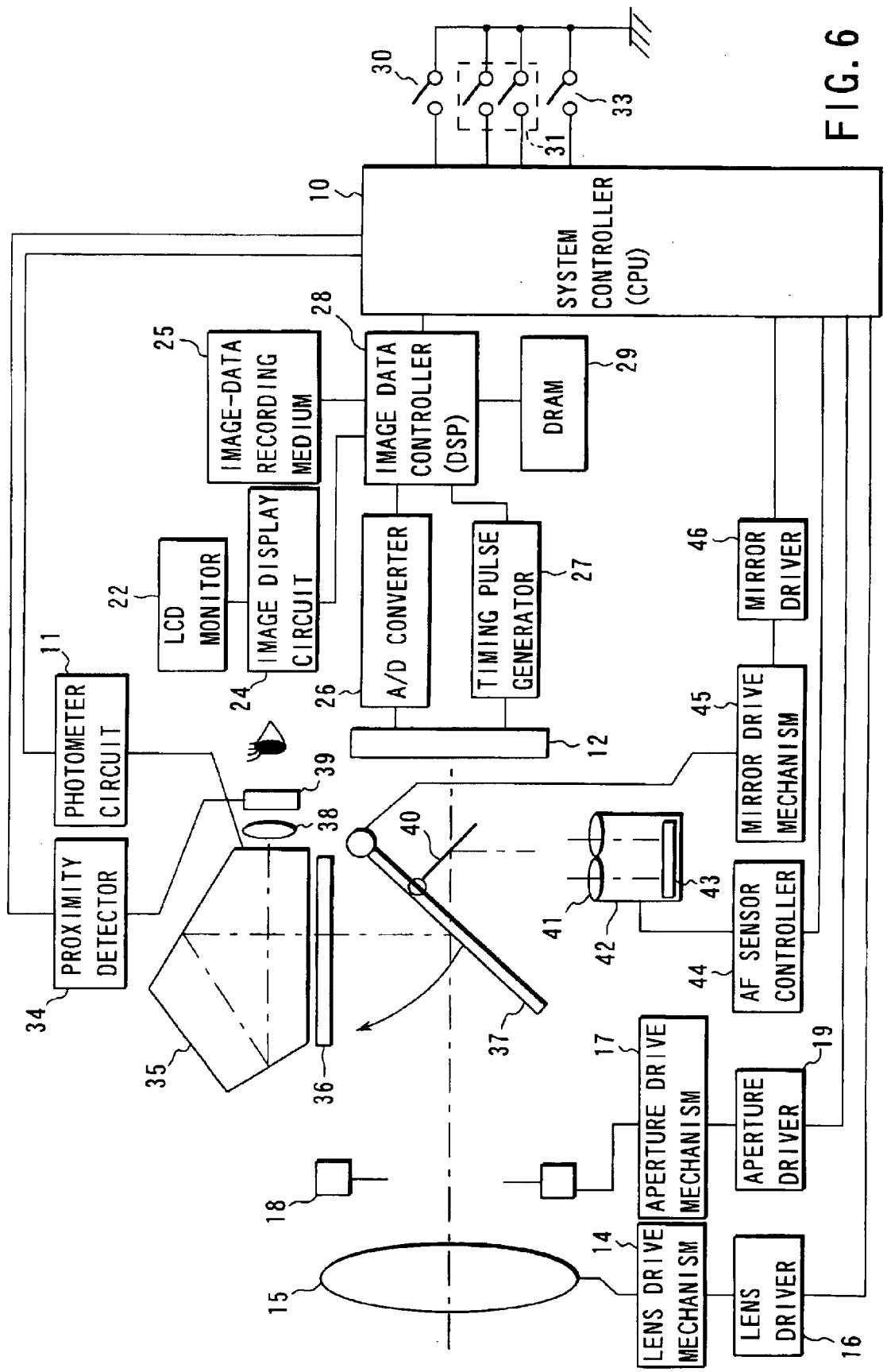
FIG. 6 is a block structural diagram of a camera according to a second embodiment of this invention.

FIG. 6 is a block structural diagram of a camera according to the second embodiment of this invention. The electronic still camera according to the above-described first embodiment is equipped with the finder optical system and the imaging optical system independent of each other. According to the second embodiment, however, this invention is adapted to an electronic still camera of a single-lens reflex type. For the same components as those of the first embodiment, their descriptions will not be repeated.

When a quick return mirror 37 is down, the subject image is formed on a focusing screen 36 by the imaging lens 15. The image on the focusing screen 36 is guided to an eyepiece 38 via a pentaprism 35. A proximity sensor 39 is provided in the vicinity of the eyepiece 38. The proximity sensor 39, for which, for example, a photo reflector or the like can be used, detects if the user's eye is close to the eyepiece 38 (if the user is optically seeing the subject). The output of the proximity sensor 39 is processed by a proximity detector 34 and is then sent to the CPU 10.

The photometer circuit 11, located in the vicinity of the eyepiece 38, measures the luminance of the subject from the subject image on the focusing screen 36. The quick return mirror 37 is driven to an up position and down position by a mirror drive mechanism 45. The mirror drive mechanism 45 includes an actuator such as a motor to which drive power is supplied from a mirror driver 46. The center portion of the quick return mirror 17 is a half mirror. The light that passes the half mirror is led to a focus detection module 42 by a sub mirror 40.

The focus detection module 42 comprises a separator lens 41 and a line sensor 43. As the separator lens 41 detects the relative distance between two subjects formed on the line sensor 43, the amount of displacement of the imaging lens 15 can be acquired. The line sensor 43 is controlled by an AF sensor controller 44. The power switch and release switch 31, which are connected to the CPU 10, have the same functions as those of the first embodiment. An LCD monitor position detecting switch 33 changes its ON and OFF states according to the position of the LCD monitor 22.

FIGS. 7A and 7B give an aerial rear view of a camera system according to this embodiment. FIG. 7A shows the LCD monitor 22 at the normal position, and FIG. 7B shows the LCD monitor 22 tilted. In the state of FIG. 7A, the LCD-monitor-position detecting switch 33 shown in FIG. 7C is off. When the LCD monitor 22 is tilted as shown in FIG. 7B, the LCD-monitor-position detecting switch 33 protracts and becomes on. At this time, image data fetched from the imaging device 12 is displayed on the LCD monitor 22. The camera can obtains an image while a user views the subject displayed on the LCD monitor 22.

Figure 8A:
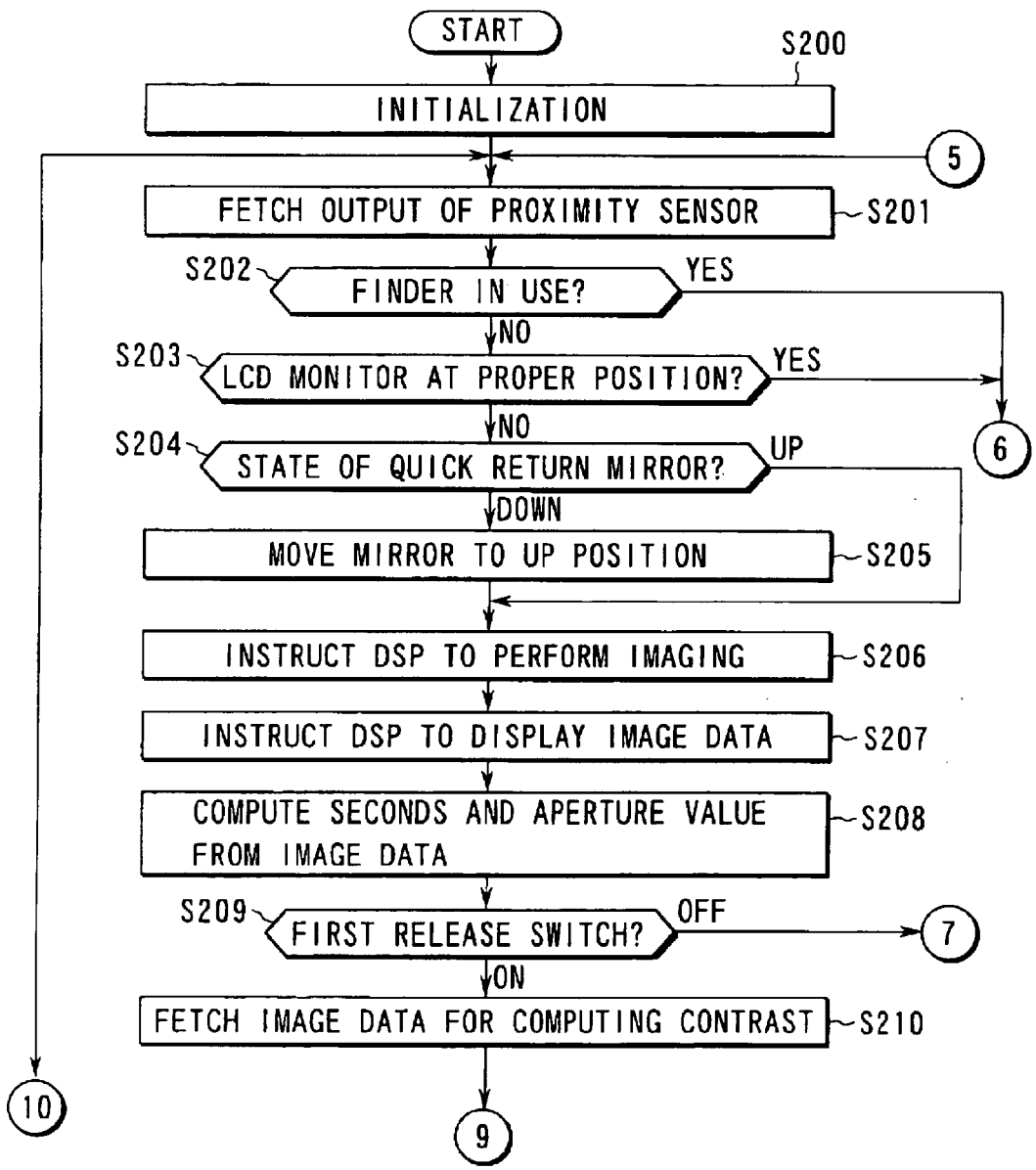
FIGS. 8A, 8B and 8C are flowcharts for explaining the operation of a CPU 10 in a second embodiment of this invention.
Figure 8B:
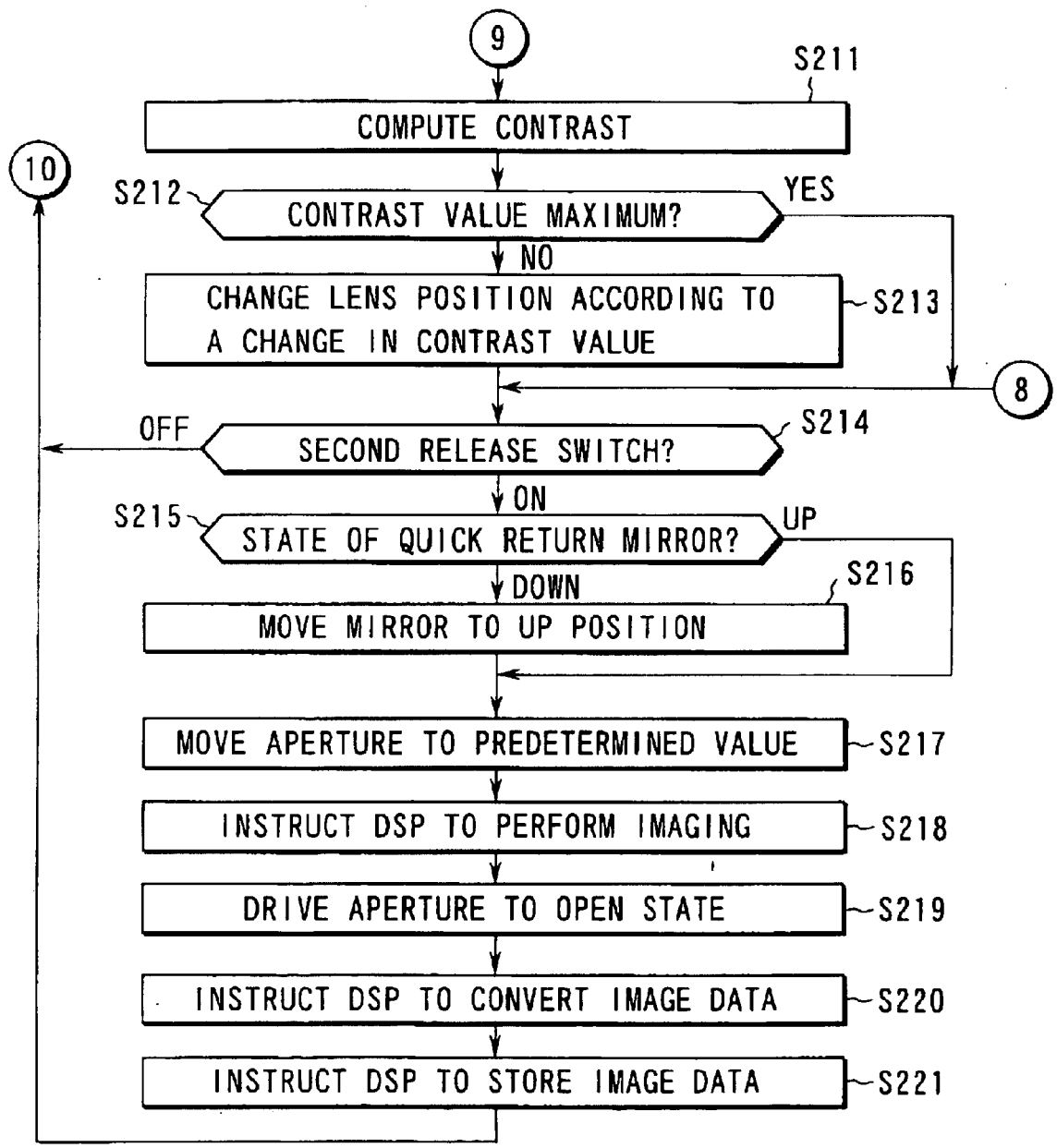
Figure 8C:
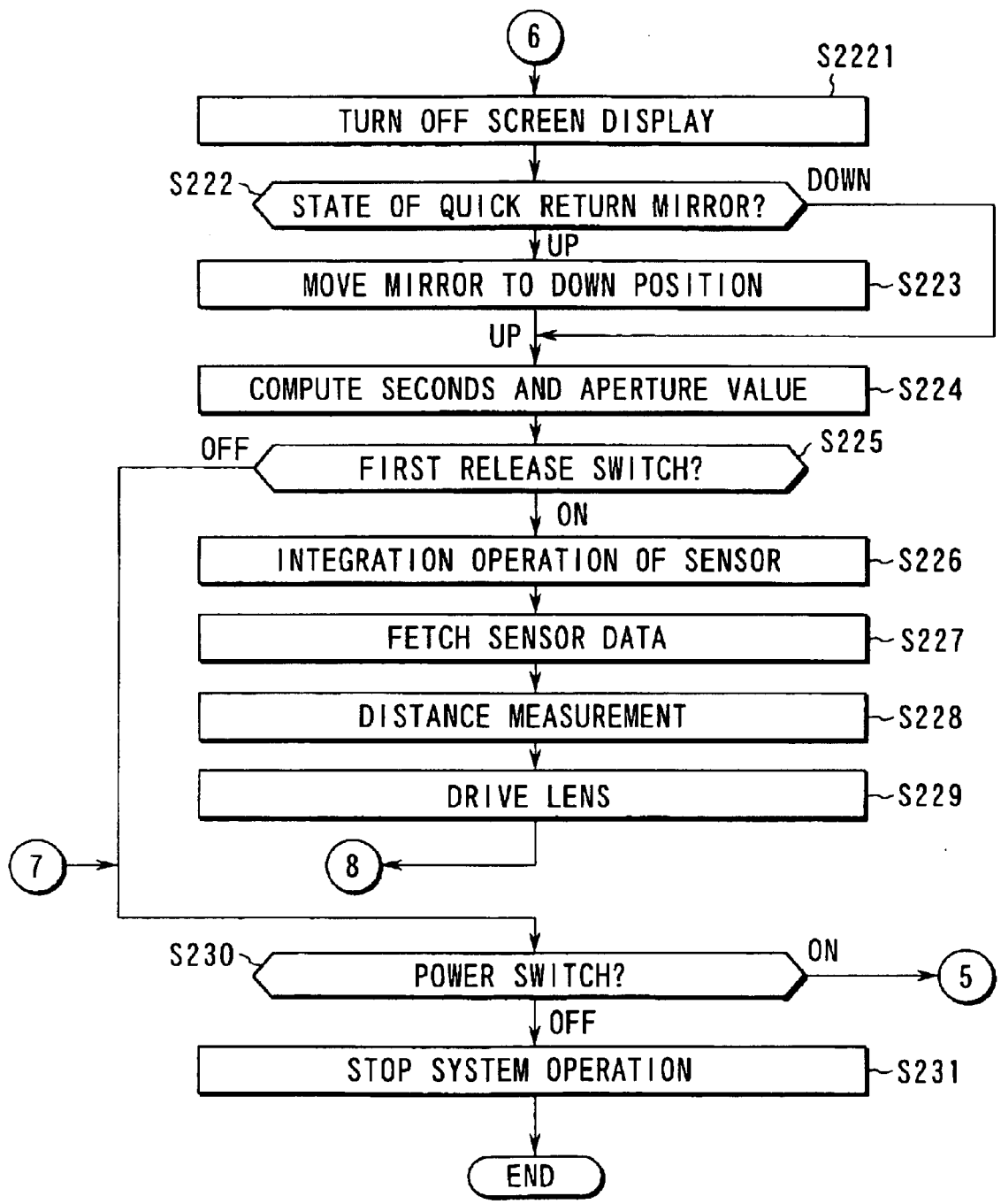

FIGS. 8A, 8B and 8C are flowcharts for explaining the operation of the CPU 10 in the second embodiment. When the power switch 30 is set on, the CPU 10 starts operating. In first step S200, the system is initialized as done in step S100. In step S201, the output of the proximity sensor 39 is input to the CPU 110 via the proximity detector 34. In step S202, the use state of the finder, i.e., whether or not the user is looking through the finder is determined based on the output of the proximity sensor 39. If the user is looking through the finder, the flow proceeds to step S221 from step S202, and if the user is not, the flow proceeds to step S203. In step S203, the use state of the LCD monitor is determined from the status of the LCD-monitor-position detecting switch 33. It is determined here if the LCD monitor 22 is at the proper position. If the LCD monitor 22 is at the proper position as shown in FIG. 7A, the flow proceeds to step S2221 from step S203. If the LCD monitor 22 is not at the proper position and is tilted as shown in FIG. 7B, the flow proceeds to step S204.

If the processes of steps S201 to S203 indicate that the user is using the finder or the LCD monitor 22 is at the proper position, it is determined that the camera is in the operation mode to carry out imaging operation while the user views the subject through the finder. Then, the sequence of processes after step S2221 is executed. If the user is not using the finder and the LCD monitor 22 is not at the proper position, it is determined that the camera is in the operation mode to carry out imaging operation while the user views the subject using the LCD monitor 22. Then, the sequence of processes after step S204 is executed.

In step S204, the status of the quick return mirror 37 is detected. When this mirror 37 is at the down position, it is not possible to fetch image data from the imaging device 12. If the quick return mirror is at the down position, therefore, the mirror 37 is driven to the up position in step S205.

In steps S206 and S207, the same operations as done in steps S116 and S117 are performed so that the subject can be seen on the LCD monitor 22. In step S208, the shutter seconds and the aperture value are determined based on the output of the imaging device 12. As the quick return mirror 37 is up now, the shutter seconds and the aperture value cannot be determined based on the output of the photometer circuit 11. In step S209, the status of the first release switch is detected. If the first release switch is off, the flow proceeds to step S230 from step S209. If the first release switch is on, the flow goes to step S210 from step S209. The operation of steps S210 to S213 is a contrast AF operation using the output of the imaging device 12, the same as the operation of steps S119 to S122. In step S214, the status of the second release switch is detected. If the second release switch is off, the flow returns to step S201, and if it is on, the flow goes to step S215. In step S215, the status of the quick return mirror 37 is detected. If this mirror 37 is at the down position, the mirror 37 is driven to the up position in step S216.

The operation of steps S217 to S221 is the same as the operation of steps S124 to S128. When the flow goes to step S2221 from step S202 or step S203, the CPU 10 instructs the DSP 28 to turn off the screen display on the LCD monitor 22.

In step S222, the status of the quick return mirror 37 is detected. If this mirror 37 is up, the subject cannot be seen through the finder. In this case, the mirror 37 is driven to the down position in step S223.

In step S224, the shutter seconds and the aperture value are computed based on the output of the photometer circuit 11. In step S225, the status of the first release switch is detected. If the first release switch is off, the flow proceeds to step S230, and if it is on, the flow proceeds to step S226. In step S226, the CPU 10 instructs the AF sensor controller 44 to perform an integration operation of the line sensor 43.

The AF sensor controller 44 permits the integration operation of the line sensor 43 for the time that corresponds to the luminance of the subject. When the integration is completed, the CPU 10 converts the output of the line sensor 43 into digital data which is in turn sent to the CPU 10.

In step S227, this digital data is read. In step S228, known phase difference computation is performed on this data to acquire the amount of defocus. Based on the defocus amount, the amount of displacement of the imaging lens 15 is obtained. In step S229, the imaging lens 15 is driven based on this displacement amount. Then, the flow proceeds to step S214 to detect the status of the second release switch. When the flow proceeds to step S230 from step S209 or step S225, the status of the power switch 30 is detected. If this power switch 30 is on, the flow proceeds to step S201 to continue the operation. If the power switch 30 is off, a process of stopping the system is performed in step S231 and the CPU 10 stops operating.

According to this embodiment, as described above, the phase-difference based AF operation is performed in the operation mode to obtain an image while allowing the user to directly see the subject through the finder, and the contrast-detection based AF operation using image data from the imaging device is performed in the operation mode to obtain an image while allowing the user to directly see the subject through the LCD monitor on which the output of the imaging device is displayed. It is therefore possible to provide an electronic still camera that has no image display break on the monitor screen while maintaining a fast AF operation which is ensured by the use of phase difference AF.

According to both the first and second embodiments, the phase-difference based AF is employed in the operation mode to obtain an image using the finder and the contrast-detection based AF is employed in the operation mode to obtain an image using the monitor. This invention is in no way restrictive to those two AF systems.

(Third Embodiment)

Figure 9A:
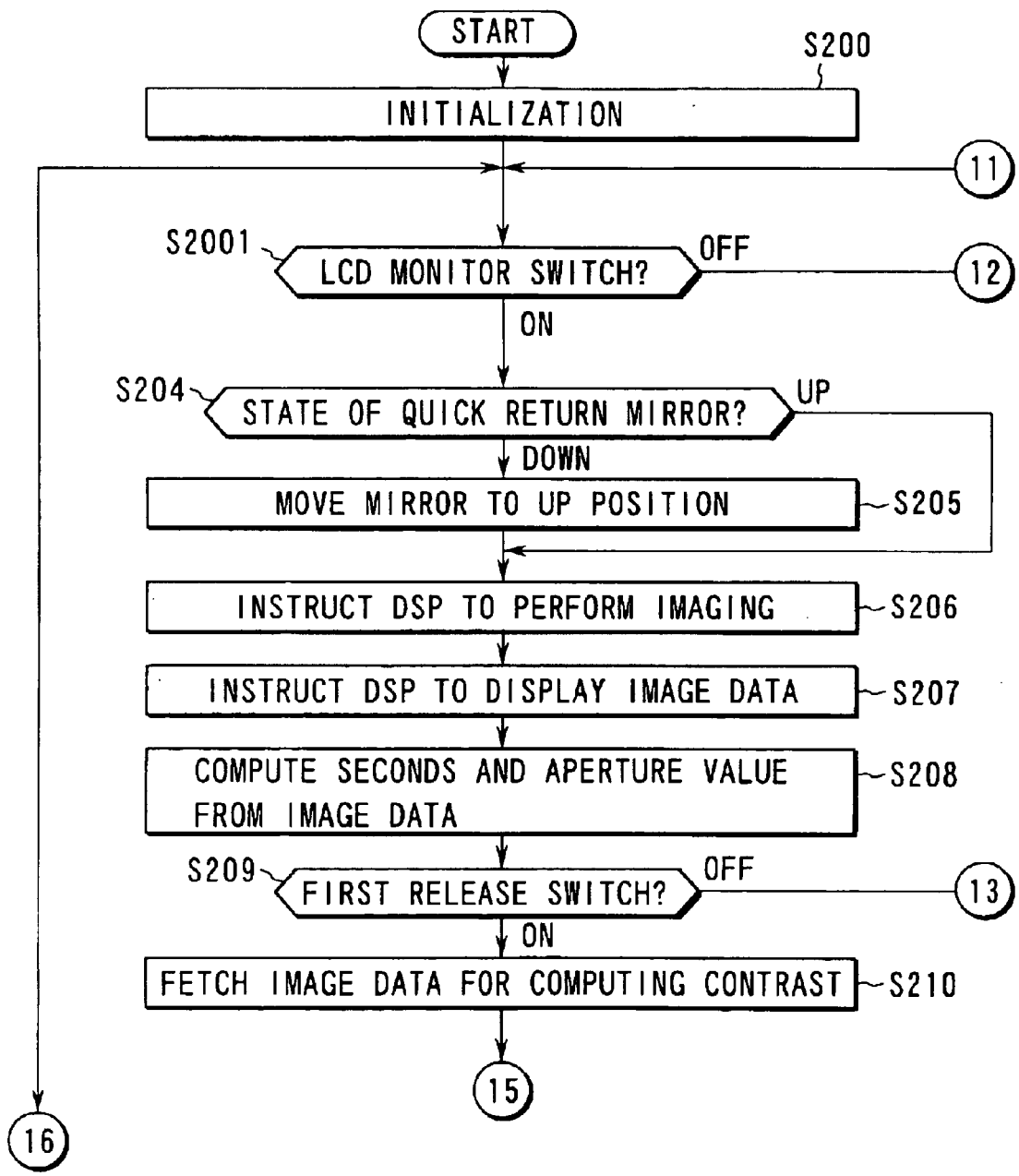
FIGS. 9A, 9B and 9C are flowcharts for explaining the operation of a CPU 10 in a third embodiment of this invention.
Figure 9B:
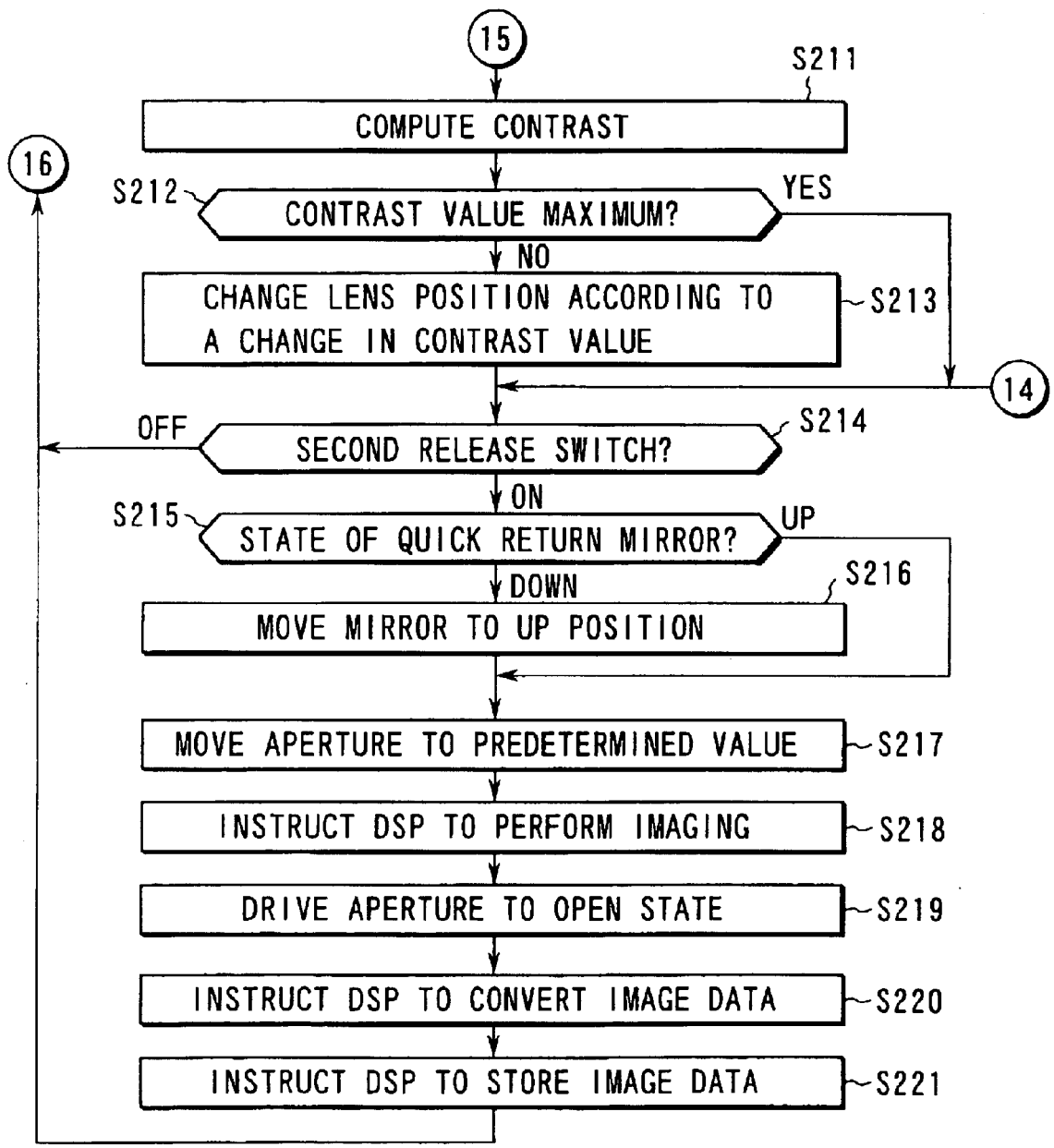
Figure 9C:
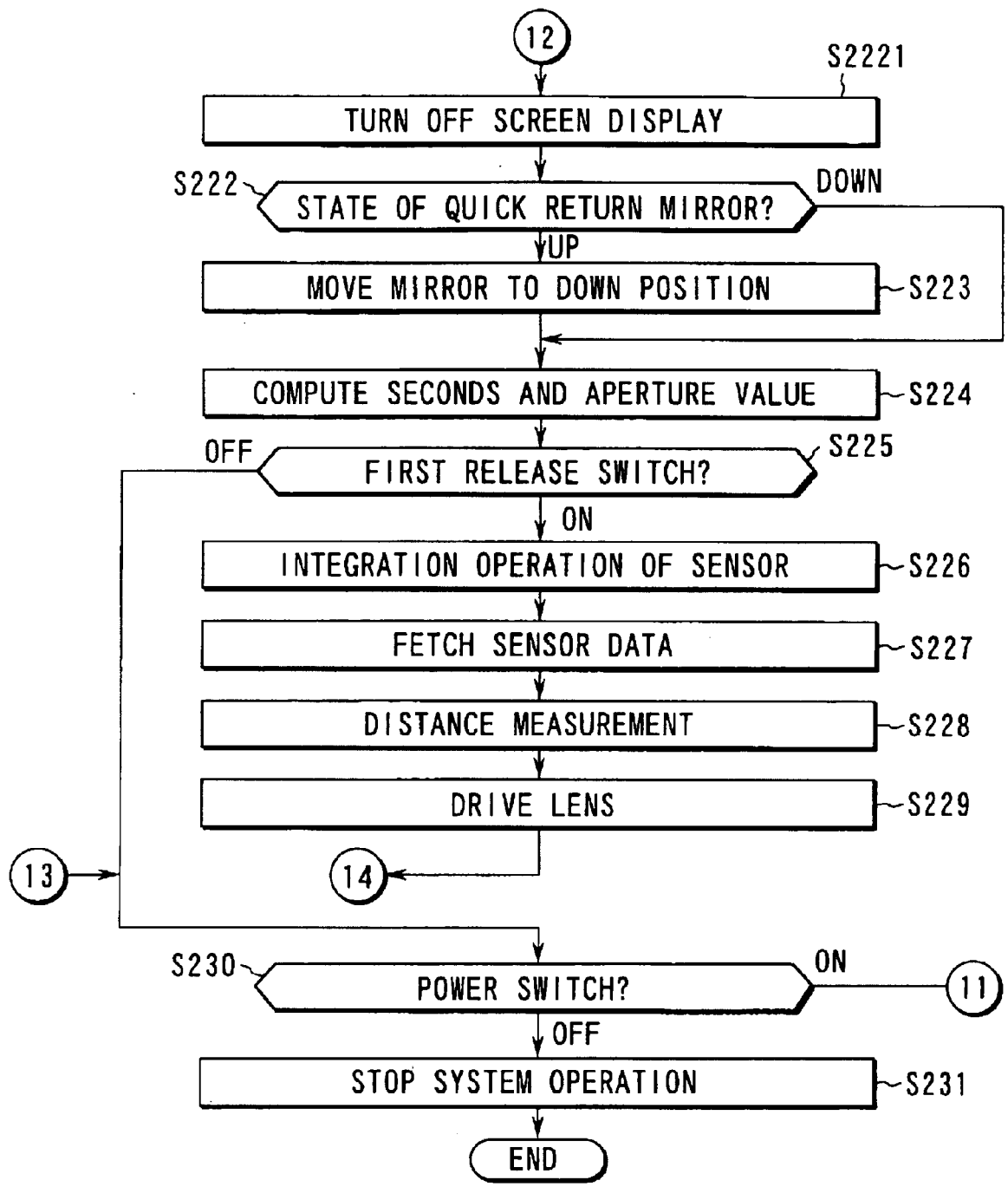

FIGS. 9A, 9B and 9C are flowcharts for explaining the operation of the CPU 10 according to the third embodiment of this invention. This flow is characterized by removing the proximity sensor for detecting if the finder is in use and the LCD-monitor position detecting switch and providing an LCD monitor switch 100 as shown in FIG. 10 instead.

The following will discuss only what differs from the flowcharts in FIGS. 8A, 8B and 8C. After initialization is carried out in step S200, the flow goes to step S2001 to determine if the LCD monitor switch 100 is on. If the LCD monitor switch 100 is on, the status of the quick return mirror is then determined in step S204. If the quick return mirror is at the down position, the mirror is driven to the up position and a through screen is displayed on the LCD monitor (step S205). In macro photographing, the user can take a picture while viewing the subject on the LCD monitor in this state. If it is determined in step S2001 that the LCD monitor switch 100 is off, the flow proceeds to step S2221 to turn off the screen.

As apparent from the above, this invention can provide an electronic still camera that has no image display break on the monitor screen while maintaining a fast AF operation which is ensured by the use of phase difference AF.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic still camera comprising:
   a finder optical system for viewing a subject image;
   an imaging section for obtaining said subject image;
   a display section for displaying said subject image based on image data associated with said subject image obtained by said imaging section;
   a mode selecting section for selecting either a first mode in which the electronic still camera performs imaging operation using said imaging section while a user views said subject image through said finder optical system or a second mode in which the electronic still camera performs imaging operation using said imaging section while the user views said subject image on said display section;
   a first focus detection circuit for carrying out a first focus detecting operation when said first mode is selected by said mode selecting section; and
   a second focus detection circuit for carrying out a second focus detecting operation when said second mode is selected by said mode selecting section.

2. The electronic still camera according to claim 1, wherein said mode selecting section includes a manual operation member.

3. The electronic still camera according to claim 1, wherein said mode selecting section includes a first use-status detection circuit for detecting how said finder optical system is used by said user.

4. The electronic still camera according to claim 1, wherein said mode selecting section includes a second use-status detection circuit for detecting how said display section is used by said user.

5. The electronic still camera according to claim 3, wherein when said first use-status detection circuit detects that said user is using said finder optical system, said first mode is selected.

6. The electronic still camera according to claim 4, wherein when said second use-status detection circuit detects that said user is using said display section, said second mode is selected.

7. The electronic still camera according to claim 1, wherein when said first mode is set by said mode selecting section, no display is made on said display section.

8. The electronic still camera according to claim 1, wherein said first focus detection circuit performs auto focus based on a computation of a phase difference.

9. The electronic still camera according to claim 1, wherein said second focus detection circuit performs contrast-computation based auto focus.

10. An electronic still camera equipped with a finder optical system and an imaging optical system independent of each other, comprising:
    a pupil splitting aperture, provided in an optical path of said imaging optical system, for splitting a subject image into a plurality of images;
    an imaging section for obtaining said subject image;
    a display section for displaying said subject image based on image data associated with said subject image obtained by said imaging section;
    a mode selecting section for selecting either a first mode in which the electronic still camera performs imaging operation using said imaging section while a user views said subject image through said finder optical system or a second mode in which the electronic still camera performs imaging operation using said imaging section while the user views said subject image on said display section;

a first focus detection circuit for carrying out a first focus detecting operation by using said pupil splitting aperture when said first mode is selected by said mode selecting section; and a second focus detection circuit for carrying out a second focus detecting operation without using said pupil splitting aperture when said second mode is selected by said mode selecting section.

11. The electronic still camera according to claim 10, further including a drive circuit for driving said pupil splitting aperture in such a way as to pass part or all of a flux of imaging light.

12. The electronic still camera according to claim 11, wherein when said first mode is set by said mode selecting section, said drive circuit drives said pupil splitting aperture in such a way as to pass part of said flux of imaging light.

13. The electronic still camera according to claim 11, wherein when said second mode is set by said mode selecting section, said drive circuit drives said pupil splitting aperture in such a way as to pass all of said flux of imaging light.

14. The electronic still camera according to claim 10, wherein said pupil splitting aperture is comprised of a liquid crystal device.

15. The electronic still camera according to claim 10, wherein said first focus detection circuit performs auto focus based on a computation of a phase difference.

16. The electronic still camera according to claim 10, wherein said second focus detection circuit performs contrast-computation based auto focus.

17. An electronic still camera of a single-lens reflex type that causes a subject image having passed an imaging optical system to be reflected by a reflection member and guided to a finder optical system, said camera comprising:

a drive circuit for moving said reflection member to a first state positioned in an optical path of said imaging optical system and a second state positioned outside said optical path of said imaging optical system;

an imaging section for obtaining said subject image;

a display section for displaying said subject image based on image data associated with said subject image obtained by said imaging section;

a mode selecting section for selecting either a first mode in which the electronic still camera performs imaging operation using said imaging section while a user views said subject image through said finder optical system or a second mode in which the electronic still camera performs imaging operation using said imaging section while the user views said subject image on said display section;

a first focus detection circuit for carrying out a first focus detecting operation when said first mode is selected by said mode selecting section; and a second focus detection circuit for carrying out a second focus detecting operation when said second mode is selected by said mode selecting section.

18. The electronic still camera according to claim 17, wherein when said first mode is selected by said mode selecting section, said drive circuit drives said reflection member in such a way as to be positioned in said first state.

19. The electronic still camera according to claim 17, wherein when said second mode is selected by said mode selecting section, said drive circuit drives said reflection member in such a way as to be positioned in said second state.

20. The electronic still camera according to claim 17, further including a proximity detection circuit, provided in said finder optical system, for detecting if said user is in a close vicinity.

21. The electronic still camera according to claim 20, wherein when said user being in a close vicinity is detected by said proximity detection circuit, a mode to be selected by said mode selecting section is automatically set to be said first mode.

22. The electronic still camera according to claim 17, further including a tilt detection circuit for detecting if said display section is tilted.

23. The electronic still camera according to claim 22, wherein when tilting of said display section is detected by said tilt detection circuit, a mode to be selected by said mode selecting section is automatically set to be said first mode.

24. A focus detection method for an electronic still camera of a single-lens reflex type, comprising:

a first focus detection step of carrying out auto focus based on a computation of a phase difference upon selection of a first mode in which the electronic still camera performs imaging operation using an imaging section while a user views a subject image through a finder optical system; and a second focus detection step of carrying out contrast-computation based auto focus upon selection of a second mode in which the electronic still camera performs imaging operation using said imaging section while the user views said subject image on a liquid crystal display section.

25. A monitor display method for an electronic still camera of a single-lens reflex type, comprising:

a mode selecting step of selecting either a first mode in which the electronic still camera performs an auto focus operation based on a computation of a phase difference and performs imaging operation using an imaging section while a user views a subject image through a finder optical system or a second mode in which the electronic still camera performs an auto focus operation based on a contrast computation and performs imaging operation using said imaging section while the user views said subject image on a display section;

a non-display step of making no monitor display when said first mode is selected by said mode selecting step; and a display step of making a monitor display based on image data associated with said subject image obtained by said imaging section, when said second mode is selected by said mode selecting step.

* * * * *